United States Patent
Jhant et al.

(10) Patent No.: US 11,724,650 B2
(45) Date of Patent: Aug. 15, 2023

(54) UTILITY VEHICLE COWL ASSEMBLY

(71) Applicant: Textron Inc., Providence, RI (US)

(72) Inventors: Philip Jhant, North Augusta, SC (US); Nick Moore, Augusta, GA (US); Matthew Baekelandt, North Augusta, SC (US)

(73) Assignee: TEXTRON INNOVATIONS INC., Providence, RI (US)

(*) Notice: Subject to any disclaimer, the term of this patent is extended or adjusted under 35 U.S.C. 154(b) by 415 days.

(21) Appl. No.: 17/122,536

(22) Filed: Dec. 15, 2020

(65) Prior Publication Data

US 2021/0094477 A1 Apr. 1, 2021

Related U.S. Application Data

(63) Continuation of application No. 16/695,311, filed on Nov. 26, 2019, now Pat. No. 10,899,283, which is a continuation of application No. 15/862,734, filed on Jan. 5, 2018, now Pat. No. 10,525,896, which is a continuation of application No. 15/042,420, filed on Feb. 12, 2016, now Pat. No. 9,896,035.

(51) Int. Cl.
*B60R 9/06* (2006.01)
*B62D 25/10* (2006.01)
*B62D 21/18* (2006.01)

(52) U.S. Cl.
CPC .............. *B60R 9/06* (2013.01); *B62D 21/183* (2013.01); *B62D 25/105* (2013.01)

(58) Field of Classification Search
CPC ........ B60R 9/06; B62D 21/183; B62D 25/105
USPC .............. 296/37.1, 37.12, 181.3, 182.1, 192
See application file for complete search history.

(56) References Cited

U.S. PATENT DOCUMENTS

| | | | | |
|---|---|---|---|---|
| 4,655,309 A * | 4/1987 | Imaizumi | ................ | F16H 63/18 180/215 |
| 4,946,193 A * | 8/1990 | Oka | ........................ | B62K 7/04 180/908 |
| 5,219,106 A * | 6/1993 | Glunt | ........................ | B60R 9/06 224/317 |
| 5,641,106 A * | 6/1997 | Slaughter | .................. | B60R 9/08 224/916 |
| 5,794,976 A * | 8/1998 | Stevicks | .................. | B62K 5/01 280/847 |
| 5,876,005 A * | 3/1999 | Vasconi | ................. | F16M 11/10 396/428 |
| 6,269,557 B1 * | 8/2001 | Henks | ........................ | E01H 5/06 74/528 |

(Continued)

*Primary Examiner* — Jason S Morrow
*Assistant Examiner* — E Turner Hicks
(74) *Attorney, Agent, or Firm* — Sandberg Phoenix & von Gontard PC

(57) ABSTRACT

The present disclosure provides a cargo rack for a utility vehicle. The cargo rack comprises a base structure, a front wall structure extending upward from the base structure and having a top edge, a pair of opposing sidewall structures, wherein each sidewall extends upward from the base structure and having a top edge, and a back wall structure extending upward from the base structure and having a top edge. The cargo rack base structure is structured to be disposed within a reservoir of a vehicle front body cowl such that the entirety of the cargo rack base structure is disposed within the cowl reservoir.

16 Claims, 8 Drawing Sheets

(56) References Cited

U.S. PATENT DOCUMENTS

| | | | | |
|---|---|---|---|---|
| 7,128,341 B1 * | 10/2006 | Dahl | ................ | B60R 9/06 180/908 |
| 7,325,848 B2 * | 2/2008 | Joseph | ................ | B60R 19/48 293/118 |
| 7,896,604 B1 * | 3/2011 | Donlin | ................ | B66D 1/00 212/294 |
| 7,954,853 B2 * | 6/2011 | Davis | ................ | B60G 7/001 180/311 |
| 8,534,519 B2 * | 9/2013 | Hancock | ................ | B62J 7/08 224/558 |
| 8,701,812 B2 * | 4/2014 | Uno | ................ | B62D 33/0625 296/180.1 |
| D713,775 S * | 9/2014 | Lagermann | ................ | D12/406 |
| D734,689 S * | 7/2015 | Hashimoto | ................ | D12/87 |
| 9,327,587 B2 * | 5/2016 | Spindler | ................ | B62D 65/10 |
| D762,517 S * | 8/2016 | Hashimoto | ................ | D12/14 |
| D780,627 S * | 3/2017 | Jhant | ................ | D12/14 |
| 2002/0070255 A1 * | 6/2002 | Hebert | ................ | B60R 9/06 224/526 |
| 2003/0015883 A1 * | 1/2003 | Boys | ................ | B60R 9/00 296/37.1 |
| 2004/0216935 A1 * | 11/2004 | Yamamoto | ................ | B62J 7/04 180/89.1 |
| 2004/0251313 A1 * | 12/2004 | Burgess | ................ | A01M 7/0014 239/100 |
| 2008/0308334 A1 * | 12/2008 | Leonard | ................ | F41A 23/34 180/90 |
| 2010/0096884 A1 * | 4/2010 | Schmidt | ................ | B62D 25/087 296/187.01 |
| 2012/0091178 A1 * | 4/2012 | Hancock | ................ | B62K 21/12 224/571 |
| 2013/0108360 A1 * | 5/2013 | Rayos | ................ | F16B 5/0664 403/361 |
| 2013/0133964 A1 * | 5/2013 | Massicotte | ................ | B60R 9/06 224/547 |
| 2013/0256050 A1 * | 10/2013 | Novotny | ................ | B62D 23/005 180/312 |

* cited by examiner

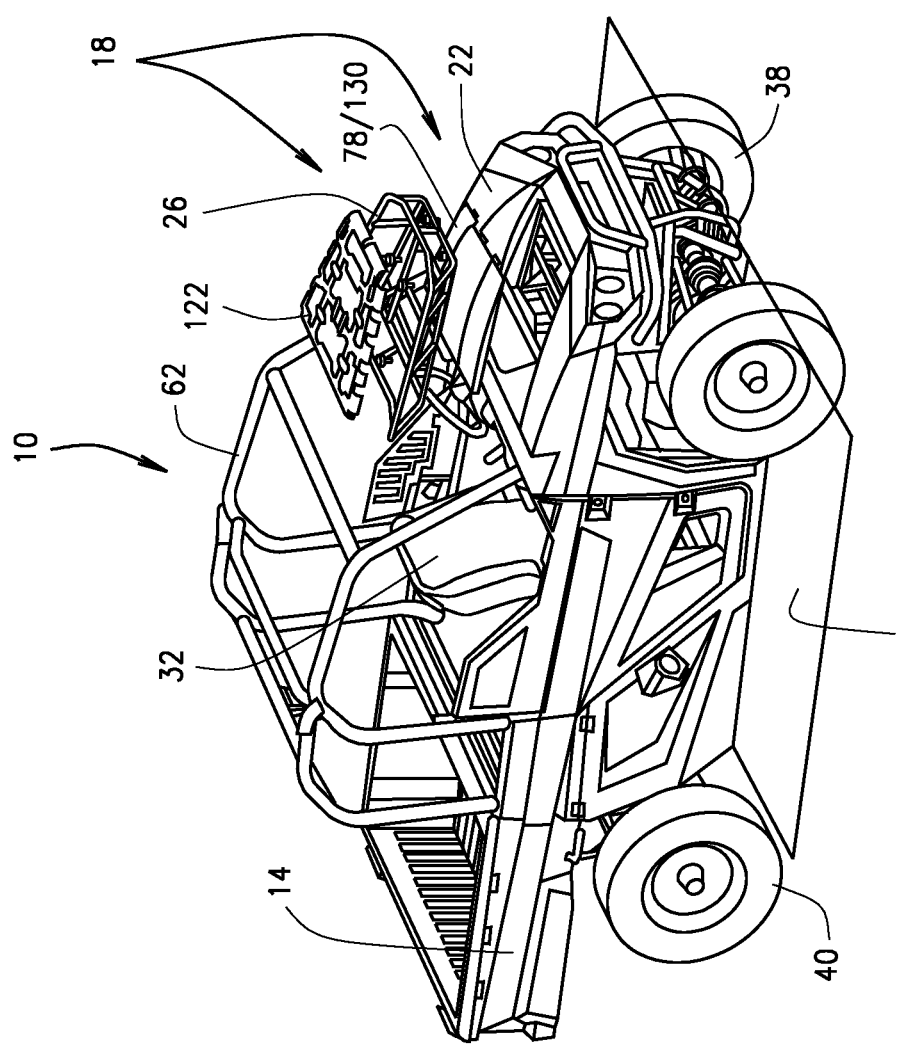

UTILITY VEHICLE COWL ASSEMBLY

CROSS-REFERENCE TO RELATED APPLICATIONS

This application is a continuation of U.S. patent application Ser. No. 16/695,311 filed Nov. 26, 2019, which is a continuation of U.S. patent application Ser. No. 15/862,734 filed on Jan. 5, 2018, which is a continuation of U.S. patent application Ser. No. 15/042,420 filed on Feb. 12, 2016, the disclosure of which is incorporated herein by reference in its entirety.

FIELD

The present teachings relate to utility vehicles, and more particularly to a front body cowl assembly for utility vehicles.

BACKGROUND

The statements in this section merely provide background information related to the present disclosure and may not constitute prior art.

Most utility vehicles that are not designated for use on roadways, e.g., all-terrain vehicles (ATVs), utility task vehicles (UTVs), recreational off-highway vehicles (ROVs), etc., typically provide a passenger compartment having one or more small article storage bins, wells and/or pockets located in and/or around the dash structure and instrument panel for holding or storing various user articles such as cell phones, sunglasses, hats, gloves, food, drinks, small hand tools, etc. However, due to their typically smaller size, users often find it infeasible to stow personal gear such as backpacks, duffle bags, sleeping bags, smaller camping equipment, rifles, handguns, bows, etc., in the small article storage bins, wells and/or pockets provided in the dash structure.

Some known utility vehicle, such as those described above, provide a cargo rack disposed above a front cowl of the vehicle forward of the passenger compartment. Such known front cargo racks are typically installed above the top surface of the cowl such that the rack is disposed at a height that is above the top surface of the dash and/or instrument panel of the vehicle. This positions such known front cargo racks well within the line-of-sight of the vehicle occupants (particularly the vehicle driver), thereby reducing the operator's field-of-view and visibility. Moreover, when gear or cargo is stored in such known front cargo racks, the occupant's field-of-view and visibility is further reduced.

SUMMARY

In various embodiments, the present disclosure provides a cargo rack for a utility vehicle. The cargo rack comprises a base structure, a front wall structure extending upward from the base structure and having a top edge, a pair of opposing sidewall structures, wherein each sidewall extends upward from the base structure and having a top edge, and a back wall structure extending upward from the base structure and having a top edge. The cargo rack base structure is structured to be disposed within a reservoir of a vehicle front body cowl such that the entirety of the cargo rack base structure is disposed within the cowl reservoir.

In various other embodiments, the present disclosure provides a utility vehicle front body cowl assembly. The cowl assembly generally comprises a front body cowl and a cargo rack disposed within a reservoir or recess of the front body cowl. More particularly, the front body cowl is connectable to at least a portion of a utility vehicle chassis forward of a passenger compartment dash console of the vehicle, and comprises a pair of opposing shoulders and a rack reservoir/recess provided between the shoulders. The cargo rack is disposed within the reservoir/recess such that the cargo rack and any gear disposed with cargo rack create little or no impedance to a line-of-sight an operator of the vehicle 10. Accordingly, the front cowl assembly described below provides good visibility and a substantially unimpeded field-of-view for the vehicle operator.

Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 8 is an isometric view of the vehicle and cowl assembly shown in FIG. 1 illustrating a removable access panel of the cowl assembly, in accordance with various embodiments of the present disclosure.

Corresponding reference numerals indicate corresponding parts throughout the several views of drawings.

DETAILED DESCRIPTION

Figure 1:
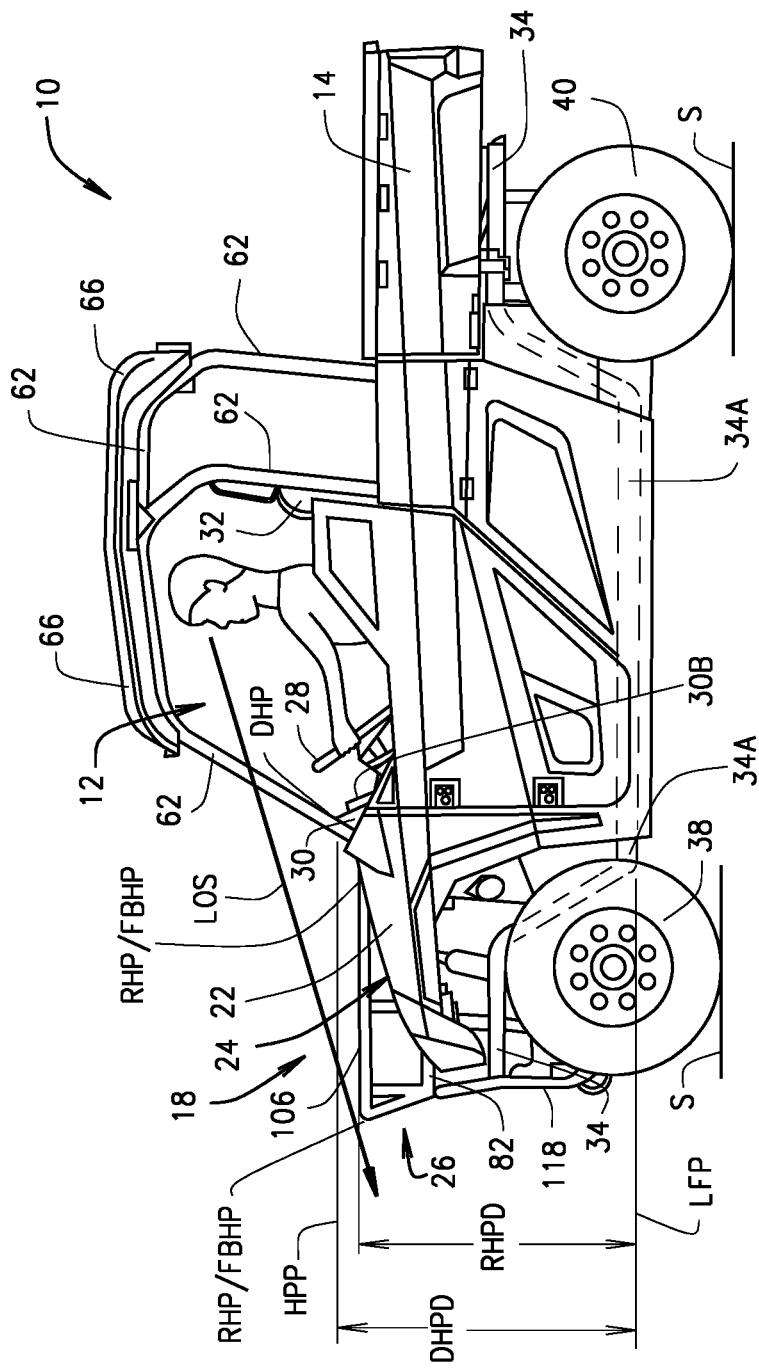
FIG. 1 is a side view of a vehicle including a passenger compartment, a rear cargo bed, and front cowl assembly having a front cowl and a front cargo rack disposed forward of the passenger compartment, within a reservoir of the cowl, and equal to or below high point plane of a dash console and instrument panel of vehicle, in accordance with various embodiments of the present disclosure.

The embodiments disclosed below are not intended to be exhaustive or to limit the invention to the precise forms disclosed in the following detailed description. Rather, the embodiments are chosen and described so that others skilled in the art can utilize their teachings. Throughout this specification, like reference numerals will be used to refer to like elements.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Figure 2:
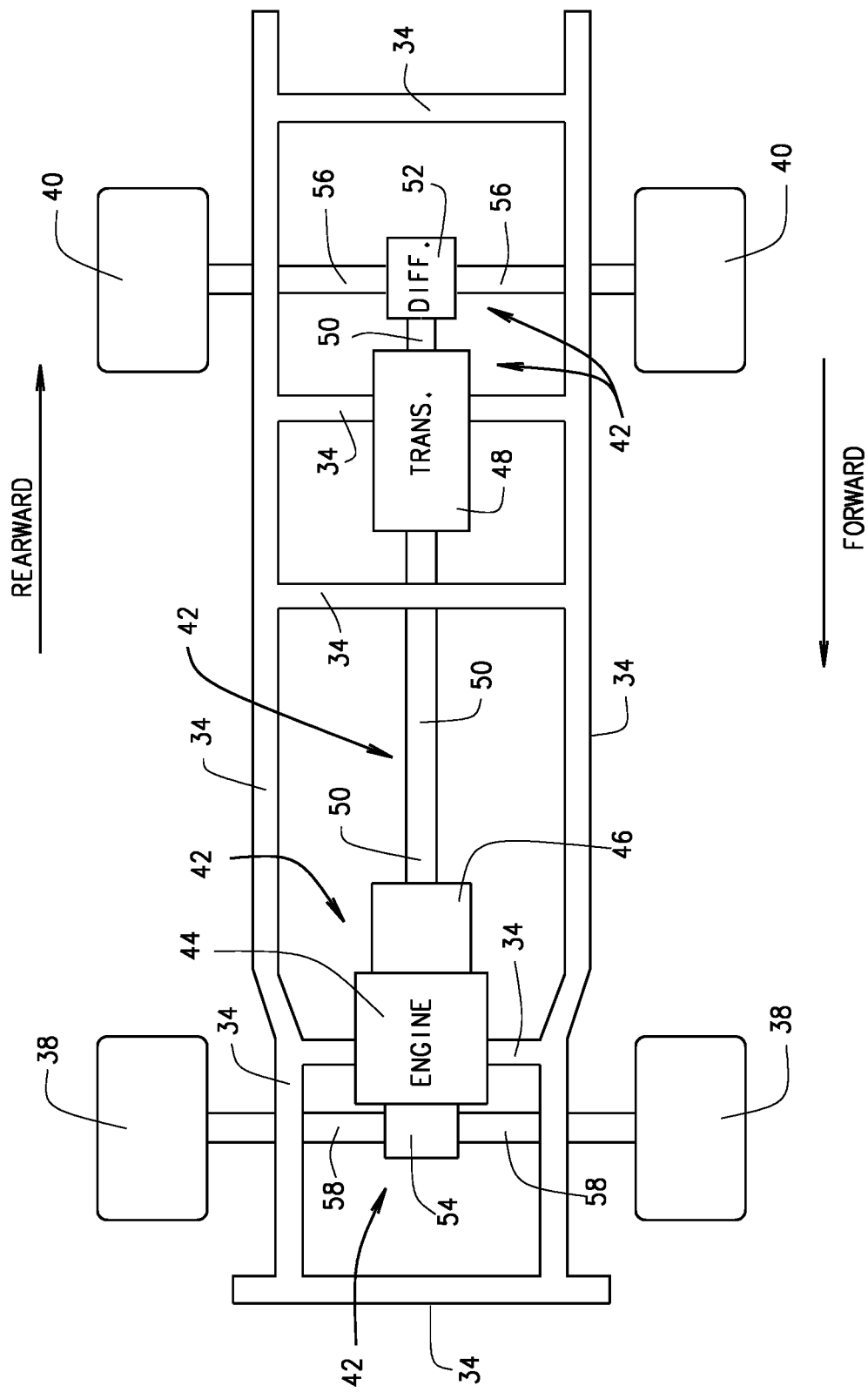
FIG. 2 is a schematic of a chassis and drivetrain of the vehicle shown in FIG. 1, in accordance with various embodiments of the present disclosure.
Figure 3:
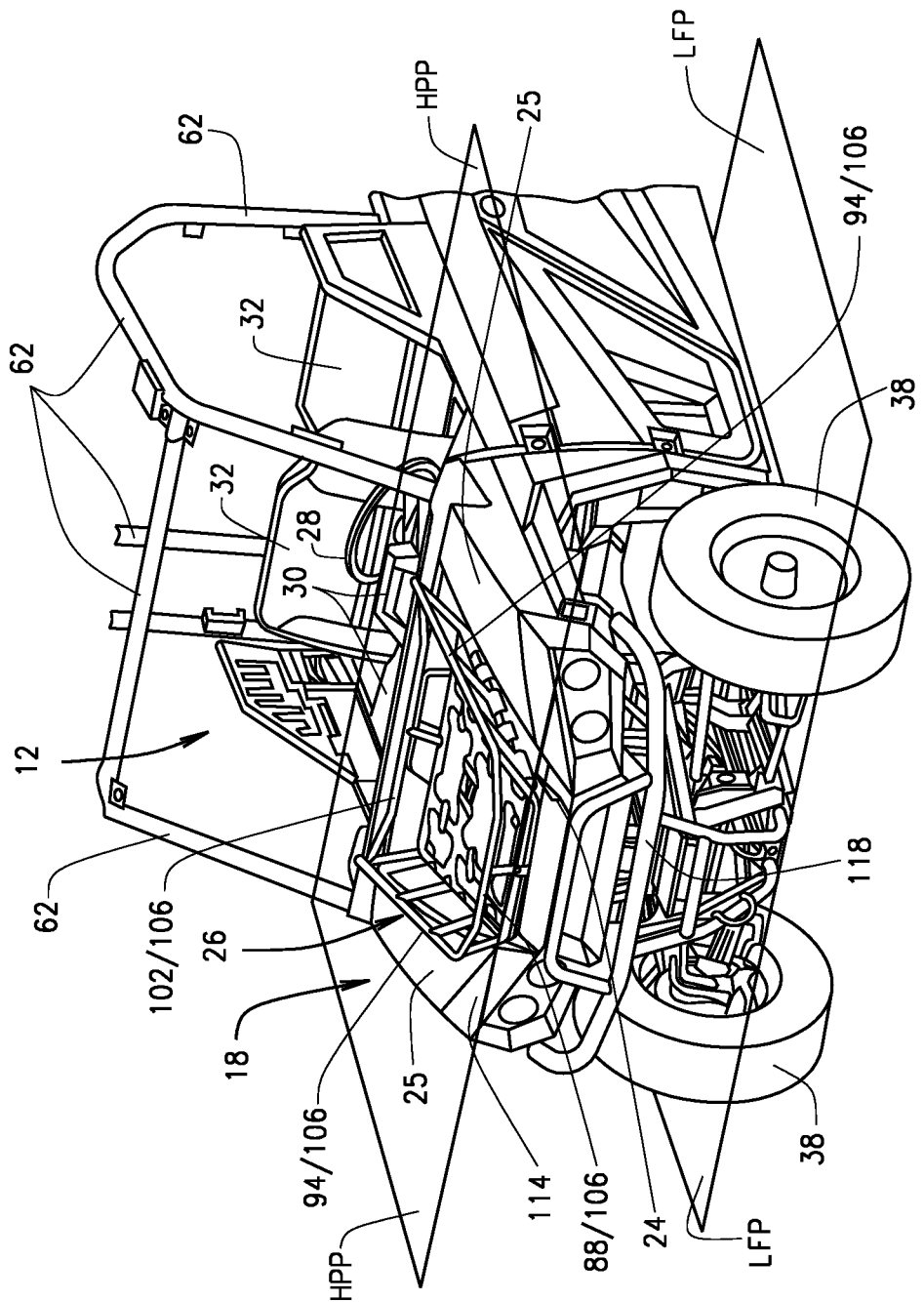
FIG. 3 is an isometric view of the vehicle and front cowl assembly shown in FIG. 1, in accordance with various embodiments of the present disclosure.

Referring to FIGS. 1 and 2, in various embodiments, the present disclosure provides a utility vehicle 10 that generally includes a passenger compartment 12, a rear cargo bed 14, and front cowl assembly 18 that includes a front cowl 22 and a front cargo rack 26 disposed forward of the passenger compartment 12 within a reservoir 24 of the cowl 22. Moreover, the front cargo rack 26 is disposed within the reservoir 24 such that at least a portion of cargo rack 26 is disposed at a height that is equal to or below a high point plane HPP of a dash console and instrument panel 30 of the vehicle 10. For simplicity, the dash console and instrument panel 30 will be referred to herein as merely the dash console 30. The vehicle 10 further includes one or more front wheels 38 operationally connected to a chassis 34 and/or other frame structure of the vehicle 10, one or more rear wheels 40 operationally connected to the chassis 34 and/or other frame structure, a drivetrain 42 operationally connected to at least one of the front and/or rear wheels 38 and/or 40, and at least one prime mover. The prime mover can comprise one of, or both of, an internal combustion engine (ICE) 44 and an electric motor 46.

As used herein, the word "forward" and the phase "forward of" are used to describe the direction from a named component or structure toward the front of the vehicle 10 along a longitudinal axis of the vehicle 10. For example, the statement that the front cargo rack 26 is disposed "forward of" the passenger compartment 12 means the front cargo rack 26 is disposed within an area that extends from the portion of the passenger compartment to the front of the vehicle 10 adjacent the front cowl 22. Similarly, as used herein, the word "rearward" and the phase "rearward of" are used to describe the direction from a named component or structure toward the rear of the vehicle 10 along a longitudinal axis of the vehicle 10.

The passenger compartment 12 generally includes the dash console 30, a seating structure 32 structured and operable to provide seating for one or more vehicle occupants, e.g., a driver and one or more passengers, a steering wheel 28 for use by the vehicle operator to control the directional movement of the vehicle 10, a brake pedal (not shown) for use by the vehicle operator to control slowing and stopping of the vehicle 10, and an accelerator pedal (not shown) for use by the vehicle operator to control the torque delivered by the prime mover(s) 42 to one or more of the rear and/or front wheels 40 and/or 38. The dash console 30 generally has a top surface 30A and a front face 30B and is structured and operable to retain, display and/or make accessible such things as an On/Off key switch, a forward/neutral/reverse selector, one or more small accessory storage pockets, a speedometer, various other gauges and/or instrumentation, a radio, and/or various other vehicle controls.

Still further, in various embodiments, the vehicle 10 can include a roll over protection system (ROPS) 62 that is disposed above and around at least a portion of the passenger compartment 12 and is structured and operable to protect passengers within the passenger compartment 12 in a situation where the vehicle 10 may be caused to overturn or roll over. The ROPS 62 comprises a plurality of tubes, bars or beams that are connected to the chassis 34 and extend above, over and around at least a portion of the passenger compartment 12. The ROPS 62 can be constructed or fabricated of any material having sufficient strength and rigidity to provide protection to the passengers of the vehicle 10 should the vehicle 10 be upset and turned on its side or rolled over, e.g., high strength steel, aluminum, titanium, carbon fiber, etc. Further yet, in various embodiments that vehicle 10 can include a roof structure 102 connected or mounted to at least a portion of the ROPS 62. The roof structure is structured and operable to protect the passenger compartment 12, particularly passengers within the passenger compartment 12, from environmental elements such as sun, rain, sleet, snow, etc.

The front cargo rack 26 is structured and operable for stowing personal gear, hand tools and other items that the vehicle operator may find undesirable to stow in a cargo bed 14 of the vehicle 10. For example, the front cargo rack 26 can be used to stow such things as backpacks, duffle bags, sleeping bags, smaller camping equipment, rifles, handguns, bows, hand tools, etc. In contrast, the cargo bed 14 is generally designed for hauling various payloads such as gravel, rock, soil, debris, garbage, wood, etc., and/or larger tools and equipment such as shovels, rakes, wheelbarrows, lawn mowers, chain saws, other motorized equipment, etc. In various implementations, the cargo bed 14 can be a fixed or stationary bed, wherein the cargo bed 14 is fixedly connected to the chassis 34 and/or other frame structure. Alternatively, in other implementations the cargo bed 14 can be a lift or dump bed, wherein the vehicle 10 includes a lift mechanism (not shown) that is operable to lift a front portion of the cargo bed 14 (i.e., the portion of the cargo bed 14 nearest the passenger compartment 12) in order to dump or easily extract items or materials from the cargo bed 14.

In various implementations wherein the vehicle 10 includes the ICE 44, the vehicle 10 additionally includes a transmission 48 operably connected to the ICE 44, e.g., directly mounted to the ICE 44 or connected via one or more drive shaft(s) 50. The transmission 48 is structured and operable to receive torque (e.g., motive force) generated by the ICE 44 and deliver the torque to one or more of the rear and/or front wheels 40 and/or 38, via the drive shaft(s) 50, a rear differential 52 and/or a front differential 54, a rear axle 56 and/or a front axle 58. In various embodiments, the transmission 48 and one of the rear or front differentials 52 or 54 can be replaced with a transaxle and remain within the scope of the present disclosure. Additionally, each of the rear and/or front axle(s) 56 and/or 58 can be either a split axle for an independent suspension system, or a one-piece axle, and remain within the scope of the present disclosure. In various implementations wherein the vehicle 10 includes the electric motor 46, the electric motor 46 can generate and provide torque directly to the front or rear axle 58 or 56, or can be configured to work in conjunction with the ICE 44 to generate and deliver torque to one or more of the front and/or rear wheels 38 and/or 40 via the drive shaft(s) 50, transmission 48, rear and/or front differential 52 and/or 54, and rear and/or front axles 56 and/or 58.

Although the vehicle 10 will be generally described and shown herein as a side-by-side all-terrain, off-road utility vehicle, it should be understood that the features disclosed herein can have application to various types of off-road, all-terrain utility vehicles such as all-terrain vehicles (ATVs), utility task vehicles (UTVs), recreational off-highway vehicles (ROVs), etc. Additionally, in various embodiments, the vehicle 10 can be structured to have a single seat, while in various other embodiments, the vehicle 10 can have one or more seats configured in a side-by-side seating arrangement, such as can be provided by one or more bench seats each capable of seating two or more passengers or by one or more row of two or more laterally spaced independent seats positioned in a side-by-side arrangement. Additionally, it should be understood that the vehicle 10 can be configured as (e.g., the drivetrain 42 of vehicle 10 can be configured to provide) a 4-wheel drive (4WD) vehicle or a 2-wheel drive (2WD) vehicle, and remain within the scope of the present disclosure. In various embodiments in which the drivetrain 42 of vehicle 10 is configured to provide a 2WD vehicle, the vehicle 10 can be driven by the rear wheels (e.g., a rear wheel drive vehicle) and/or by the front wheels (e.g., a front wheel drive vehicle). In some embodiments in which the vehicle 10 can be configured as a 4WD vehicle, the vehicle 10 can be selectively operated in two or more drive modes, such as a 2WD mode and a 4WD mode, through actuation of a switch or other user input device that can be disposed on the instrument panel 30.

Furthermore, it should be understood that, based on the particular configuration of the prime mover, that is, based on whether the vehicle 10 includes just the ICE 44, just the electric motor 46, or both the ICE 44 and the electric motor 46, and whether the vehicle 10 is configured as a 4WD vehicle or a 2WD vehicle, the drivetrain 42 can comprise any or all of, individually or in any combination, the transmission 48, the drive shaft(s) 50, the rear differential 52 the rear axle 56, the front differential 54, and the front axle 58. In some embodiments in which the vehicle 10 includes a rear differential 52 and/or front differential 54, the vehicle 10 can be selectively operated in one or more drive modes defined based at least in part on whether the rear differential 52 and/or front differential 54 is locked or unlocked. Such drive modes can, for example, be selectable through actuation of a switch or other user input device that can be disposed on the instrument panel 30.

Figure 5:
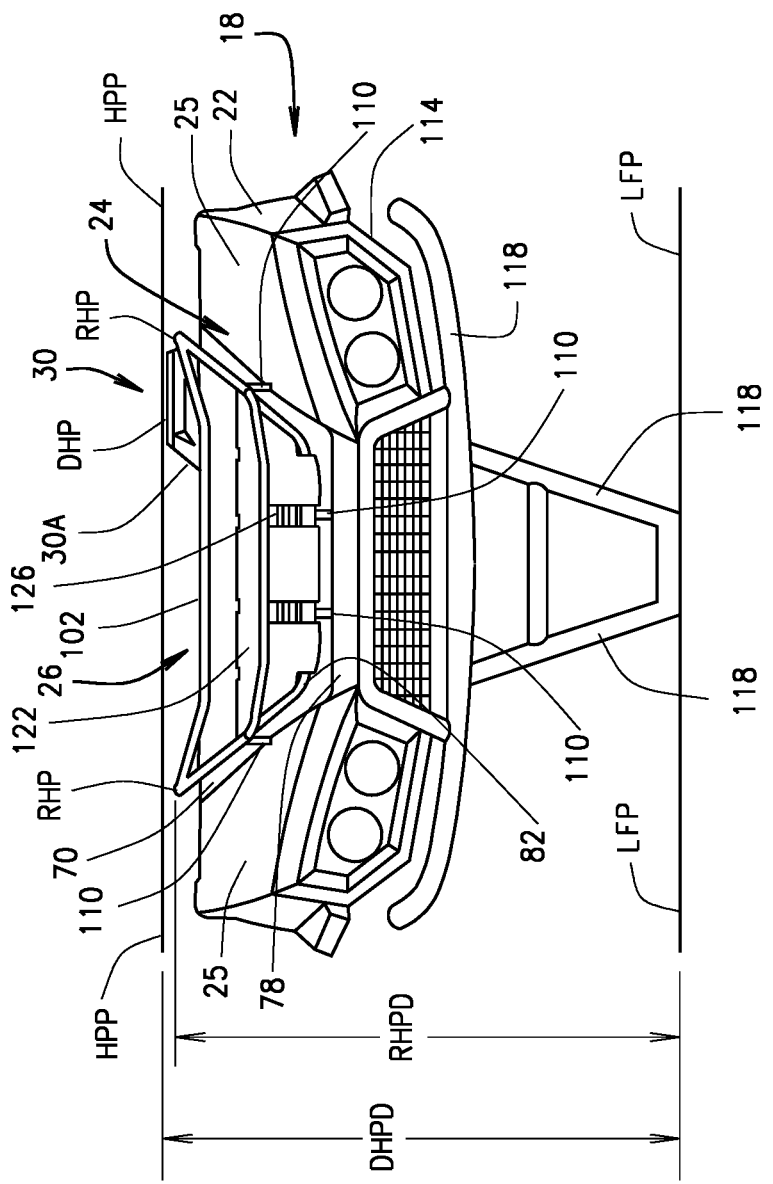
FIG. 5 is a front view of the front cowl assembly shown in FIG. 1, in accordance with various embodiments of the present disclosure.
Figure 6:
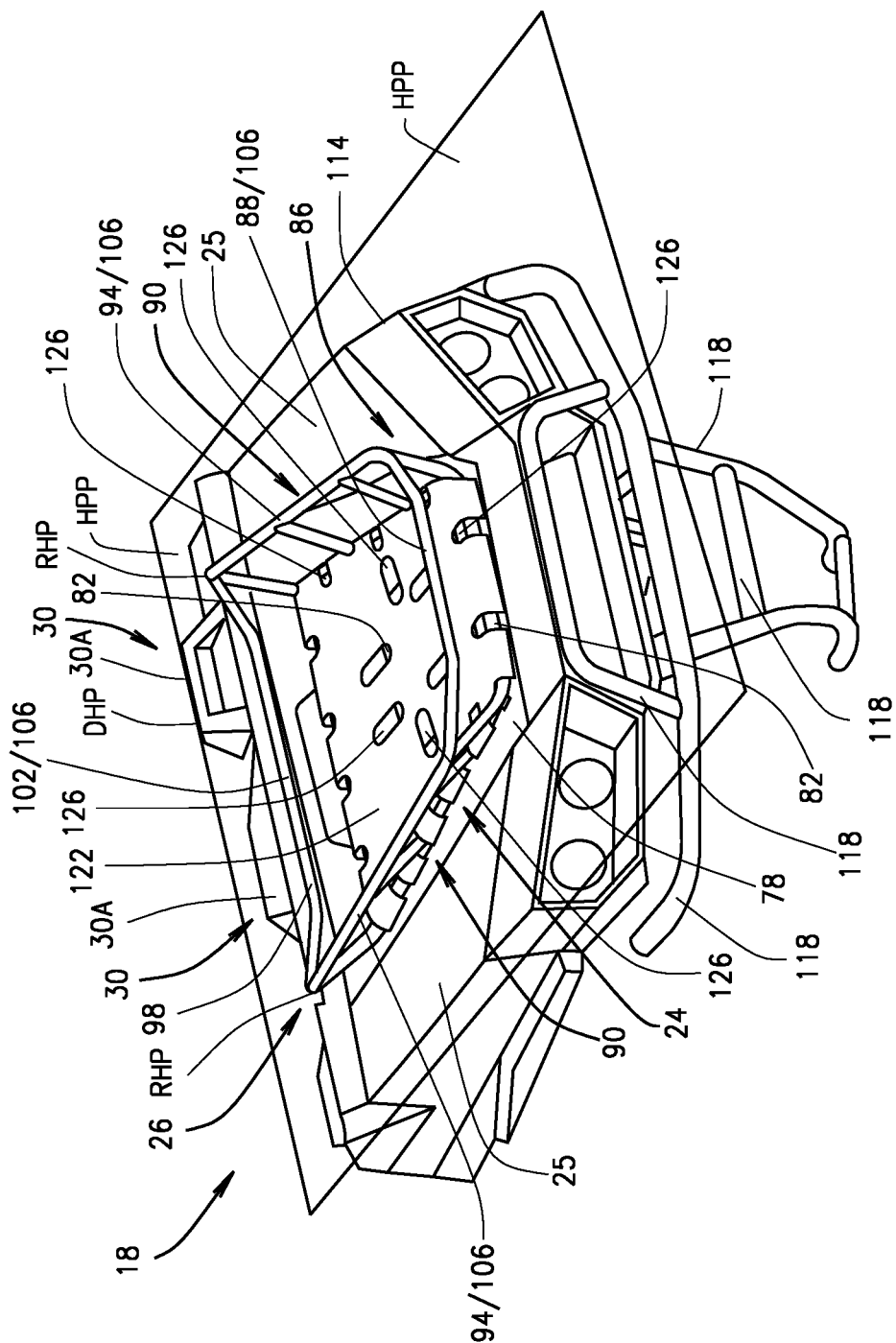
FIG. 6 is an isometric view of the front cowl assembly shown in FIG. 1, in accordance with various embodiments of the present disclosure.
Figure 7:
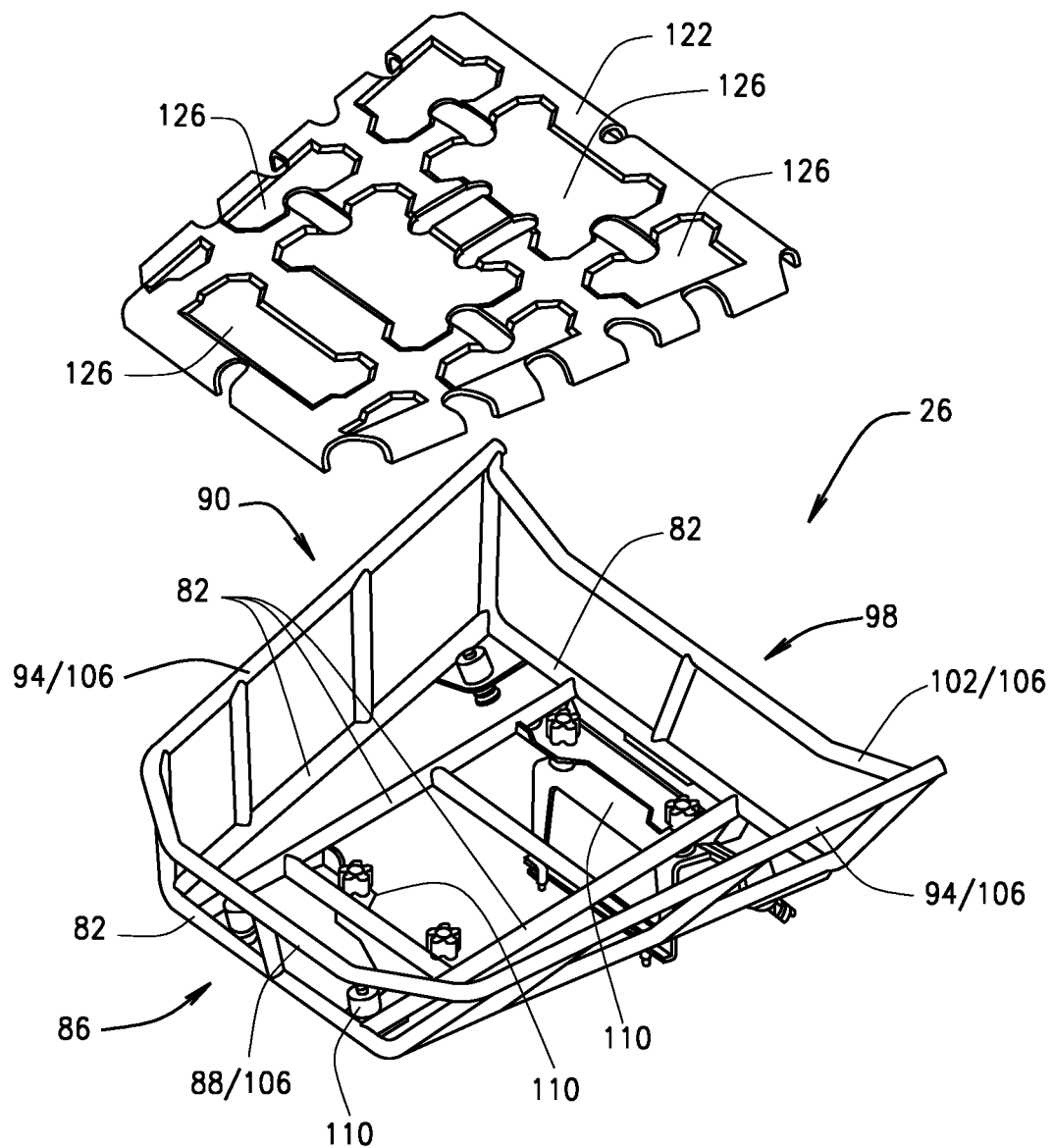
FIG. 7 is an isometric view of the cargo rack of the front cowl assembly shown in FIG. 1, in accordance with various embodiments of the present disclosure.

Referring now to FIGS. 1, 3, 4, 5, 6, 7 and 8, the front cowl assembly 18 is at least partially connected to the vehicle chassis 34 and, as described above, comprises the front cowl 22 and the front cargo rack 26 disposed within the reservoir 24 of the front cowl 22, forward of the passenger compartment 12. The front cowl 22 comprises the reservoir 24 disposed between a pair of opposing shoulders 25 (best shown in FIG. 4), wherein the reservoir 24 comprises at least a back wall 70, a pair of opposing sidewalls 74 and a bottom panel 78. As best illustrated in FIG. 7, the cargo rack 26 comprises a bottom or base structure 82, a front wall structure 86 extending upward from the base structure 82 and having a top edge 88, a pair of opposing sidewall structures 90 extending upward from the base structure 82 and having a top edge 94, and a back wall structure 98 extending upward from the base structure 82 and having a top edge 102. The top edges 88, 94 and 102 of the front wall structure 86, sidewall structures 90 and back wall structure 98 collectively form a top perimeter edge 106 of the cargo rack 26.

The cargo rack base structure 82, front wall structure 86, sidewall structures 90 and back wall structure 98 can be fabricated of an material and having any form or structure suitable to provide a base structure on which cargo can be placed and wall structures operable to retain cargo within the cargo rack 26. For example, in various embodiments, one or more of the base structure 82, front wall structure 86, sidewall structures 90 and back wall structure 98 can be a solid, perforated or mesh panel connected to a skeletal frame or basket to provide the cargo rack 26. Such panel(s) can be fabricated of any suitable material, e.g., plastic, metal, fiberglass, polycarbonate, etc. In various other embodiments, the cargo rack 26 can be molded, cast or stamped as a single-piece plastic, metal, fiberglass, polycarbonate, etc., rack or basket. In yet other embodiments, as illustrated throughout the various figures, the cargo rack 26 can be fabricated of tubing, rods or bars, fabricated of plastic, metal, fiberglass, polycarbonate, etc., that are interconnected to form a skeletal frame or basket.

The size and shape of the cowl reservoir 24 (e.g., the height, shape and length of the back wall 70 and sidewalls 74), and the size and shape of the cargo rack 26 (e.g., the height, shape and length of front wall structure 86, sidewall structures 90, and back wall structure 98) are such that at least a portion of the cargo rack 26 is located at a height that is equal to or below a high point plane HPP of the vehicle dash console 30, relative to a plane LFP of a lower frame 34A of the vehicle chassis 34 (shown in FIGS. 1 and 5). The lower chassis frame plane LFP extends horizontally across the lower frame 34A of the chassis 34 (e.g., extends from a bottom of the lower chassis 34A substantially horizontal and parallel to a ground surface S on which the vehicle 10 sets). The high point plane HPP of the dash console 30 is defined herein as a horizontal plane (e.g., a plane that is substantially horizontal and parallel to the ground surface S) extending through a high point DHP of the top surface 30A of a driver's side half of the dash console 30 (as shown in FIGS. 1, 5 and 6). The driver's side half of the dash console 30 being the portion of the dash console that is generally disposed on the driver's half of the passenger compartment within a line-of-sight (LOS) of the driver as the driver looks forward across the front cowl assembly 18 toward the terrain in front of the vehicle 10. The high point DHP of the dash console 30 is defined herein as the point along the top surface 30A of dash console 30 that is the greatest distance (shown as dash high point distance DHPD in FIGS. 1 and 5) from the lower chassis frame plane LFP. The dash console high point DHP can be located anywhere along the top surface 30A of the entire dash console 30 depending on the shape and orientation of the dash console 30. For example, the dash console high point DHP can be located along top surface 30A of an instrument panel portion of the dash console 30 (as shown in FIGS. 1, 5 and 6) on the driver's side half of the dash console 30.

For example, in various embodiments, a lower portion of one or more of the cargo rack front wall structure 86, sidewall structures 90, and back wall structure 98 can be located at a height that is below the high point plane HPP, while an upper portion of one or more of the cargo rack front wall structure 86, sidewall structures 90, and back wall structure 98 is located above the HPP. By way of another example, in various embodiments, at least a portion of the perimeter edge 106 of the rack can be located at a height that is equal to or below the high point plane HPP of the vehicle dash console 30, relative to the lower chassis frame plane LFP, while at least another portion of the perimeter edge 106 of the rack, and possibly a portion of one or more of the front wall structure 86, sidewall structures 90, and back wall structure 98, is located above the HPP.

By way of yet another example, in various embodiments, it is envisioned that a high point FBHP of one or both of the cargo rack front wall structure top edge 88 and/or back wall structure top edge 102 can be located at a height that is equal to or below the high point plane HPP of the vehicle dash console 30. In such embodiments a high point of one or both side wall structure top edges 94 can be above the high point plane HPP. The high point FBHP of the cargo rack cargo rack front wall structure top edge 88 and/or back wall structure top edge 102 is defined herein as the point along the cargo rack front wall structure top edge 88 and/or back wall structure top edge 102 that is the greatest distance (shown as rack high point distance RHPD in FIGS. 1 and 5) from the lower chassis frame plane LFP. The high point FBHP of the cargo rack front wall structure top edge 88 and/or back wall structure top edge 102 can be located anywhere along the cargo rack front wall structure top edge 88 and/or back wall structure top edge 102 depending on the shape and orientation of the cargo rack 26.

By way of still yet another example, in various embodiments, the cowl reservoir 24 and cargo rack 26 can be sized and shaped such that a high point RHP of the cargo rack perimeter edge 106 can be located at a height that is equal to or below the high point plane HPP of the vehicle dash console 30, relative to the lower chassis frame plane LFP. The high point RHP of the cargo rack perimeter edge 106 is defined herein as the point along the perimeter edge 106 that is the greatest distance (shown as rack high point distance RHPD in FIGS. 1 and 5) from the lower chassis frame plane LFP. The rack high point RHP of the perimeter edge 106 can be located anywhere along the entire perimeter edge 106 depending on the shape and orientation of the cargo rack 26. For example, the high point RHP of the rack perimeter edge 106 can be located at the end of one or both of the top edge(s) 94 of one or both of the sidewall structure(s) 90 (as shown in FIGS. 5, 6 and 7), along the top edge 88 of the front wall structure 86 (as shown in FIG. 1), or anywhere else along the perimeter edge 106 depending on the shape and orientation of the cargo rack 26.

Importantly, the cowl rack assembly 18 is structured, e.g., cowl reservoir 24 and cargo rack 26 are sized and shaped, such that at least a portion of the of the cargo rack 26 is located at a height that is equal to or below the high point plane HPP of the vehicle dash console 30. Moreover, having the cargo rack 26 disposed within the cowl reservoir 24, as described above, positions the cargo rack 26 and any gear disposed with the cargo rack 26 in a location that is less likely to impede a line-of-sight LOS of an operator of the vehicle 10. Hence, the front cowl assembly 18 as described herein provides more visibility and a greater field-of-view for the vehicle operator than known vehicles that have cargo racks disposed above the top surface of the front cowl such that they substantially impeded the line-of-sight and field-of-view of an operator of the vehicle.

In various embodiments, the cargo rack 26 can be fixedly connected or mounted to the cowl 22 within the reservoir 24. In such embodiments, the cargo rack 26 can be mounted to the cowl 22 using any suitable fastening device or method. For example, as shown in FIG. 5, in various implementations, the cargo rack 26 can be mounted to the cowl 22 using a plurality of stand-off brackets 110 that are structured and operable to mount the cargo rack 26 to the cowl 22 such that the cargo rack 26 is retained a distance above the reservoir bottom panel 78. This allows access to the space between the reservoir bottom panel 78 and the cargo rack base structure 82, which can aid in securing items within the cargo rack 26. Alternatively, in various other embodiments, the cargo rack 26 can be removably connected or mounted to the cowl 22 within the reservoir 24 using any suitable engageable/disengageable latching, clasping or decoupling retention device. Still further, in various embodiments, the cargo rack 26 can be pivotally or hingedly connected to the cowl 22 within the reservoir 24 such that one edge of the base structure 82 or a portion of the perimeter edge 106 is pivotally or hingedly connected to the cowl 22 and one or more of the other edges of the base structure 82 and/or portions of the perimeter edge 106 are removably connected to the cowl 22 via any suitable engageable/disengageable latching, clasping or decoupling retention device.

In various embodiments, the cowl assembly 18 can include a front fascia 114 that is structured and operable to retain and position one or more headlights of the vehicle 10. In various instances of such embodiments, the front fascia 114 can have a shape and contour such that a top surface of the fascia 114 has a contour, or shape, that is substantially the same as the contour, or shape, of the cowl shoulders 25 and reservoir 24.

Additionally, in various embodiments, the cowl assembly 18 can include a brush guard 118 that is operably connected or mounted to the chassis 34 and disposed forward of the cowl 22 (and fascia 114 if present), relative to the passenger compartment 12. The brush guard 118 is structured and operable to protect the front of the vehicle 10, e.g., the cowl 22 and/or front fascia 114, from damage by such things as bushes, branches, weeds, small trees, etc., that may come into contact with cowl assembly 18 during operation of the vehicle 10. In various instances of such embodiments, the cargo rack 26 can be sized to extend beyond the front edge of the cowl 22, or front fascia 114 (if present), such that the front edge of the cargo rack base structure 82 can be connected to the brush guard 118. In such instances, the front edge of the cargo rack base structure 82 can be fixedly connected to the brush guard 118 using any suitable fastening device or method, removably connected to the to the brush guard 118 any suitable engageable/disengageable latching, clasping or decoupling retention device, or hingedly connected to the brush guard using any suitable hinged connection device.

Referring now to FIGS. 5, 6, 7 and 8, in the various embodiments wherein the cargo rack 26 is fabricated of tubing, rods or bars that are interconnected to form a skeletal frame or basket, the cargo rack 26 can additionally include a floor panel 122 that is disposable or disposed over, and in various instances connectable or connected to, the base structure 82. The floor panel 122 is structured and operable to provide a greater amount of surface area for supporting cargo disposed within the rack 26 than is provided by the skeletal frame of the base structure 82 alone. In various embodiments, the floor panel 122 can comprise one or more tie-down aperture 126 that can be used to hook elastic cords or straps into, or to insert rope, string or cording through, in order to aid in securing cargo within the rack 26.

Figure 4:
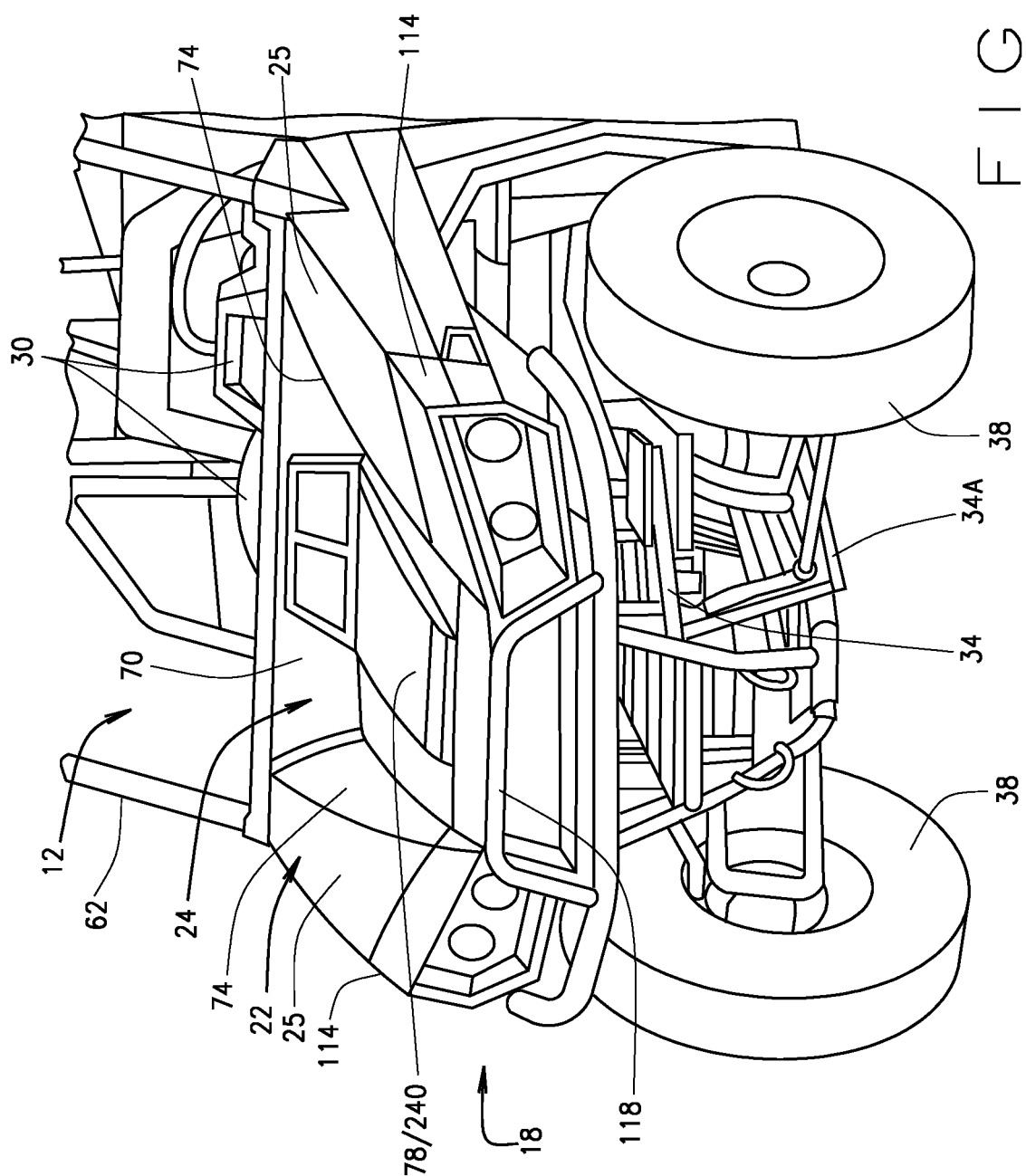
FIG. 4 is an isometric view of the vehicle and front cowl assembly shown in FIG. 1, wherein a cargo rack of the front cowl assembly is absent, in accordance with various embodiments of the present disclosure.

Referring now to FIGS. 4 and 8, in various embodiments the bottom panel 78 of the rack reservoir 24 can include, or be structured and operable to provide, an access panel 130 that can be opened or removed to provide access to components of the vehicle 10 that are located below the cowl 22. For example, in various instances, the bottom panel 78 can comprise a frame portion that defines an opening and the access panel 130 that is hingedly or removably connected to the frame portion. Accordingly, the access panel 130 can be raised/opened or removed to allow access to the vehicle components located beneath the cowl 22, and lowered/closed or installed to cover the opening and the vehicle components located beneath the cowl 22. In such instances, the access panel 130 can be hingedly connected and/or removably connected to the frame portion via any suitable hinged connector, and/or any suitable engageable/disengageable fastening device.

Alternatively, as illustrated by way of example in FIG. 8, in various instances, the bottom panel 78 can be structured and operable to provide, or serve as, the access panel 130. That is, in such instances, the bottom panel 78 is hingedly or removably connected to one or more of the reservoir back wall 70 and/or reservoir sidewalls 74 and/or front fascia 114 (if present). Accordingly, the bottom/access panel 78/130 can be raised/opened or removed to allow access to the vehicle components located beneath the cowl 22, and lowered/closed or installed to cover the opening and the vehicle components located beneath the cowl 22. The bottom/access panel 78/130 can be hingedly connected and/or removably connected to the one or more of reservoir back wall 70 and/or reservoir sidewalls 74 and/or front fascia 114 (if present) via any suitable hinged connector, and/or any suitable engageable/disengageable latching, clasping or decoupling retention device.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A cargo rack for a utility vehicle, said cargo rack comprising:
 a base structure:
 a front wall structure extending upward from the base structure and having a top edge;
 a pair of opposing sidewall structures, each sidewall extending upward from the base structure and having a top edge;
 a back wall structure extending upward from the base structure and having a top edge, wherein the cargo rack base structure is structured to be disposed within a reservoir of a vehicle front body cowl such that the entirety of the cargo rack base structure is disposed within the cowl reservoir; and
 a floor panel disposed over the base structure, the floor panel structured and operable to support cargo within the rack.

2. The cargo rack of claim 1, wherein the floor panel comprises at least one tie-down aperture structured and operable to provide access to the base structure for securing cargo to the base structure.

3. The cargo rack of claim 1, wherein the cargo rack is structured such that when the cargo rack is disposed within the cowl reservoir, at least a portion of at least one of the front wall structure, the sidewall structures and the back wall structure is below a height of a high point plane of a top surface of a dash console of the vehicle, relative to a plane of a chassis lower frame of the vehicle.

4. The cargo rack of claim 1, wherein the top edges of the front wall, sidewalls and back wall collectively form a perimeter edge of the cargo rack, and wherein the cargo rack is structured such that when the cargo rack is disposed within the cowl reservoir, at least a portion of the perimeter edge, is one of below and equal to a height of a high point plane of a top surface of a dash console of the vehicle, relative to a plane of a chassis lower frame of the vehicle.

5. The cargo rack of claim 1, wherein the top edges of the front wall, sidewalls and back wall collectively form a perimeter edge of the cargo rack, and wherein the cargo rack is structured such that when the cargo rack is disposed within the cowl reservoir, a high point of the perimeter edge is one of below and equal to a height of a high point plane of a top surface of a dash console of the vehicle, relative to a plane of a chassis lower frame of the vehicle.

6. A utility vehicle front body cowl assembly, said assembly comprising
   a front body cowl connectable to at least a portion of a utility vehicle chassis forward of a passenger compartment dash console of the vehicle, the front body cowl comprising:
      a pair of opposing shoulders; and
      a cargo rack reservoir provided between the shoulders; and
   a cargo rack comprising:
      a base structure:
      a front wall structure extending upward from the base structure and having a top edge;
      a pair of opposing sidewall structures, each sidewall extending upward from the base structure and having a top edge;
      a back wall structure extending upward from the base structure and having a top edge, wherein the cargo rack base structure is structured to be disposed within a reservoir of a vehicle front body cowl such that the entirety of the cargo rack base structure is disposed within the cowl reservoir; and
      a floor panel disposed over the base structure, the floor panel structured and operable to support cargo within the rack.

7. The cowl assembly of claim 6, wherein the cargo rack floor panel comprises at least one tie-down aperture structured and operable to provide access to the base structure for securing cargo to the base structure.

8. The cowl assembly of claim 6, wherein the top edges of the cargo rack front wall, sidewalls and back wall collectively form a perimeter edge of the cargo rack, and wherein, when the cowl assembly is connected to the vehicle chassis, at least a portion of at least one of the cargo rack front wall structure, the sidewall structures and the back wall structure is below a height of a high point plane of a top surface of the dash console, relative to the plane of the chassis lower frame.

9. The cowl assembly of claim 8 wherein when the cowl assembly is connected to the vehicle chassis, at least a portion of the cargo rack perimeter edge, is one of below and equal to a height of the high point plane of a top surface of the dash console, relative to the plane of the chassis lower frame.

10. The cowl assembly of claim 8, wherein when the cowl assembly is connected to the vehicle chassis, a height of a high point of the cargo rack perimeter edge, is one of below and equal to a height of a high point plane of a top surface of the dash console, relative to the plane of the chassis lower frame.

11. A utility vehicle, said vehicle comprising:
   a chassis;
   a plurality of wheels operationally connected to the chassis;
   a drivetrain operatively connected to at least one of the wheels;
   at least one prime mover mounted to the chassis and operatively connected to the drivetrain and structured and operable to provide motive force, via the drivetrain, to the at least one wheel operatively connected to the drivetrain;
   a passenger compartment supported by the chassis, the passenger compartment comprising:
      a dash console comprising a front face and a top surface;
      a steering wheel; and
      a passenger seating structure; and
   a front body cowl assembly, the cowl assembly comprising:
      a pair of opposing shoulders; and
      a cargo rack reservoir provided between the shoulders; and
   a cargo rack comprising:
      a base structure:
      a front wall structure extending upward from the base structure and having a top edge;
      a pair of opposing sidewall structures, each sidewall extending upward from the base structure and having a top edge;
      a back wall structure extending upward from the base structure and having a top edge, wherein the cargo rack base structure is structured to be disposed within a reservoir of a vehicle front body cowl such that the entirety of the cargo rack base structure is disposed within the cowl reservoir; and
      a floor panel disposed over the base structure, the floor panel structured and operable to support cargo within the rack.

12. The utility vehicle of claim 11, wherein the cargo rack floor panel comprises at least one tie-down aperture structured and operable to provide access to the base structure for securing cargo to the base structure.

13. The utility vehicle of claim 11, wherein the cargo rack reservoir comprises a bottom panel, the bottom panel comprising a removable access panel structured and operable to provide access to one or more vehicle components disposed beneath the front body cowl.

14. The utility vehicle of claim 11, wherein the top edges of the cargo rack front wall, sidewalls and back wall collectively form a perimeter edge of the cargo rack, and wherein, when the cowl assembly is connected to the vehicle chassis, at least a portion of at least one of the cargo rack front wall structure, the sidewall structures and the back wall structure is below a height of a high point plane of a top surface of the dash console, relative to the plane of the chassis lower frame.

15. The utility vehicle of claim 14 wherein when the cowl assembly is connected to the vehicle chassis, at least a portion of the cargo rack perimeter edge, is one of below and equal to a height of the high point plane of a top surface of the dash console, relative to the plane of the chassis lower frame.

16. The utility vehicle of claim 14, wherein when the cowl assembly is connected to the vehicle chassis, a height of a high point of the cargo rack perimeter edge, is one of below and equal to a height of a high point plane of a top surface of the dash console, relative to the plane of the chassis lower frame.

* * * * *